United States Patent
Schaefer

(10) Patent No.: US 8,491,232 B2
(45) Date of Patent: Jul. 23, 2013

(54) HOLDER FOR A CHIP-REMOVING TOOL INSERT

(75) Inventor: Hans Schaefer, Gomaringen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 330 days.

(21) Appl. No.: 12/942,604

(22) Filed: Nov. 9, 2010

(65) Prior Publication Data
US 2011/0058908 A1    Mar. 10, 2011

Related U.S. Application Data

(63) Continuation-in-part of application No. PCT/EP2009/002948, filed on Apr. 23, 2009.

(30) Foreign Application Priority Data

May 9, 2008   (DE) ..................... 10 2008 023 767

(51) Int. Cl.
*B23B 29/14*   (2006.01)

(52) U.S. Cl.
CPC ........................... *B23B 29/14* (2013.01)
USPC ............................. 407/110; 407/117

(58) Field of Classification Search
USPC ............... 407/107, 109, 110, 111, 117
IPC ............................. B23B 27/16,29/14
See application file for complete search history.

(56) References Cited

U.S. PATENT DOCUMENTS

| | | | | |
|---|---|---|---|---|
| 2,371,715 A | * | 3/1945 | Smith et al. | 407/10 |
| 4,357,123 A | * | 11/1982 | Zweekly | 407/110 |
| 4,938,640 A | * | 7/1990 | Pano et al. | 407/110 |
| 5,267,817 A | * | 12/1993 | Englund | 407/110 |
| 5,516,241 A | * | 5/1996 | Plutschuck et al. | 407/110 |
| 5,888,028 A | * | 3/1999 | Grainger et al. | 407/110 |
| 6,139,227 A | * | 10/2000 | Schafer et al. | 407/110 |

FOREIGN PATENT DOCUMENTS

| | | | |
|---|---|---|---|
| CH | 661674 A5 | * | 8/1987 |
| DE | 3942585 A1 | * | 7/1990 |
| EP | 0937526 A1 | | 8/1999 |
| SU | 1400790 A2 | | 6/1988 |
| WO | WO-97/17154 A1 | | 5/1997 |

* cited by examiner

*Primary Examiner* — Daniel Howell
*Assistant Examiner* — Alan Snyder
(74) *Attorney, Agent, or Firm* — Saliwanchik, Lloyd & Eisenschenk

(57) ABSTRACT

The present invention relates to a holder for a machining tool insert, in particular a lancing or cutting insert, having an approximately beam-shaped cutter holder, a cavity formed inside the end thereof, which serves as a receiving pocket for the tool insert and is bounded by clamping jaws that define the clearance width of the receiving pocket, a slot extending with a first end to within the proximity of the inner edge of the receiving pocket so as to permit elastic pivotability of one of the clamping jaws, and having a clamping arrangement comprising an actuation member for producing a clamping force that acts within the region of the slot upon the pivotable clamping jaw. In order to attain improved absorption of transverse force components acting upon the pivotable clamping jaw, it is furthermore provided in said holder that the second end of the slot extends within the proximity of the lateral edge of the cutter holder, with an elastic connecting web that bridges the second end of the slot being disposed between the pivotable clamping jaw and the cutter holder.

18 Claims, 9 Drawing Sheets

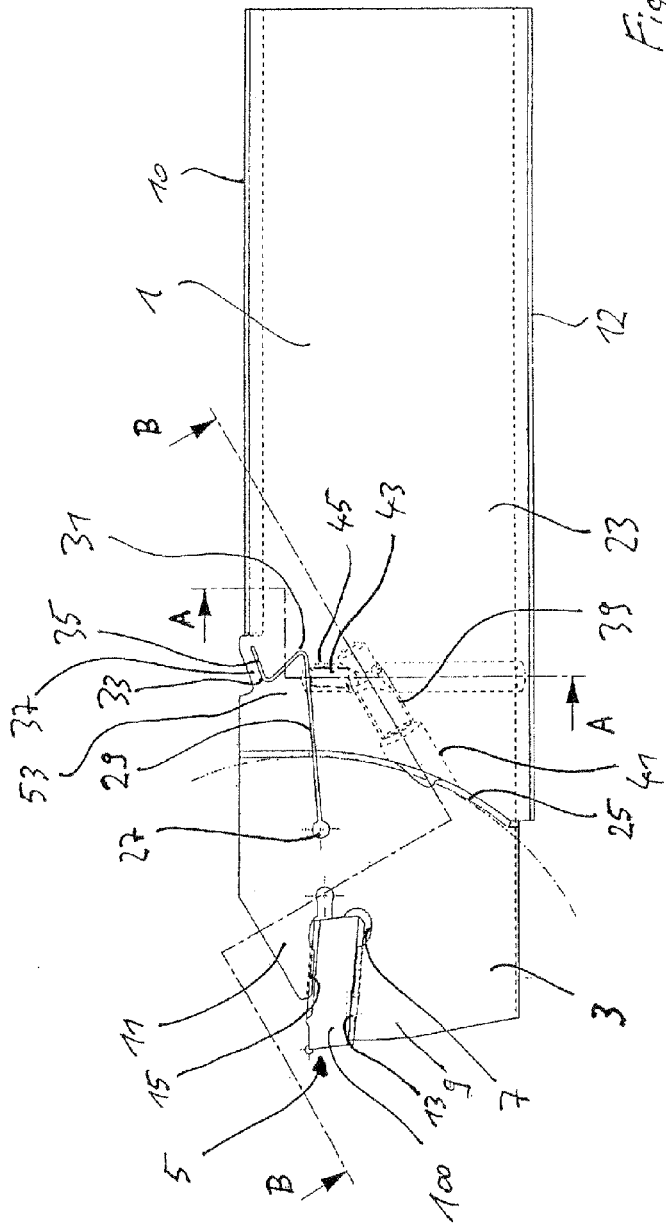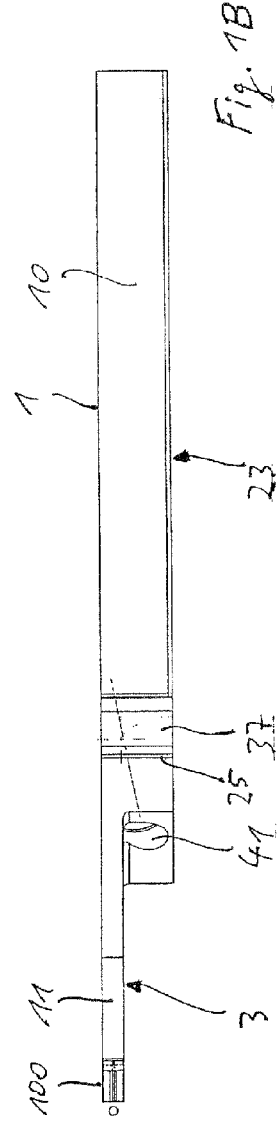

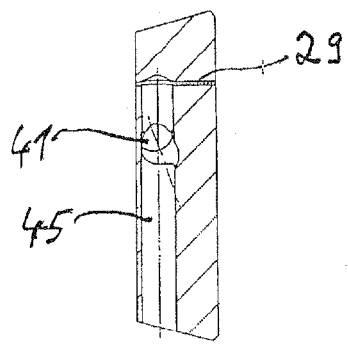
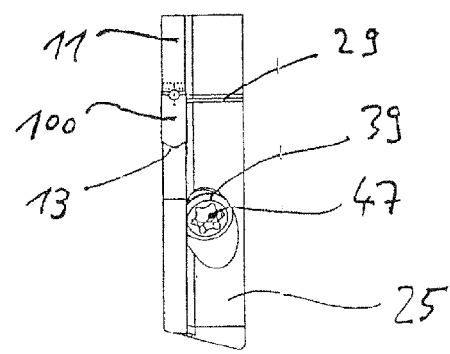
Fig. 1C
Fig. 1D
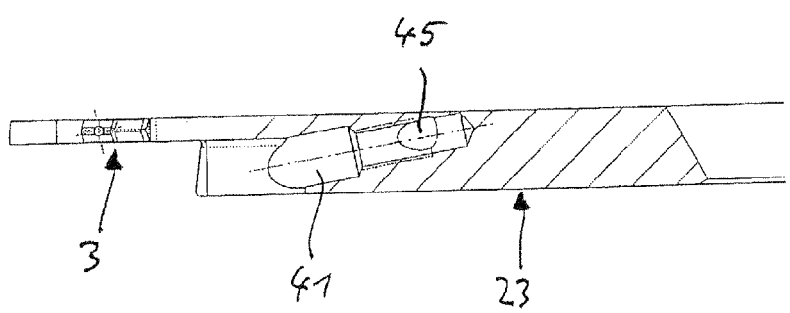
Fig. 1E
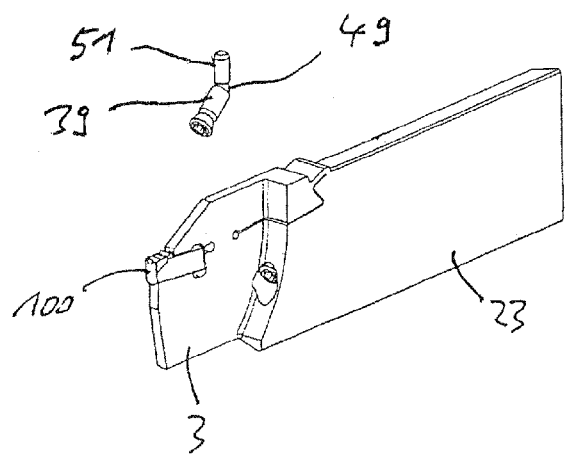
Fig. 1F

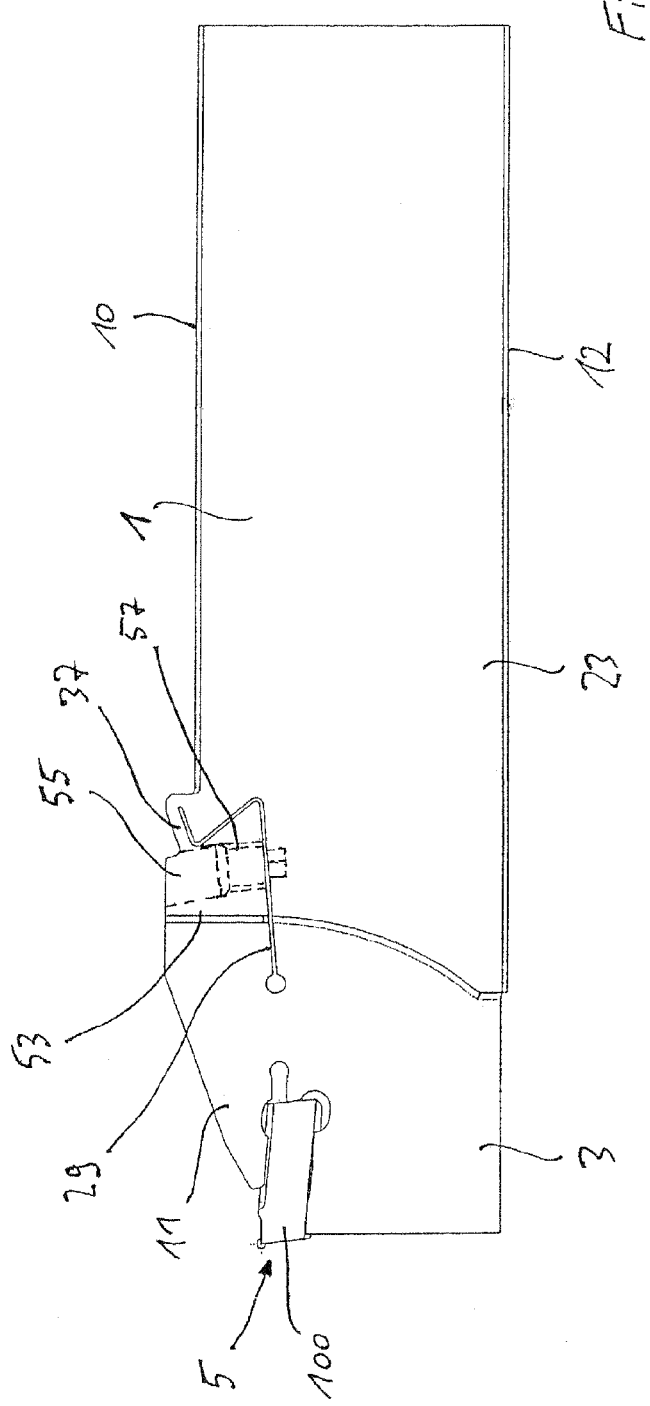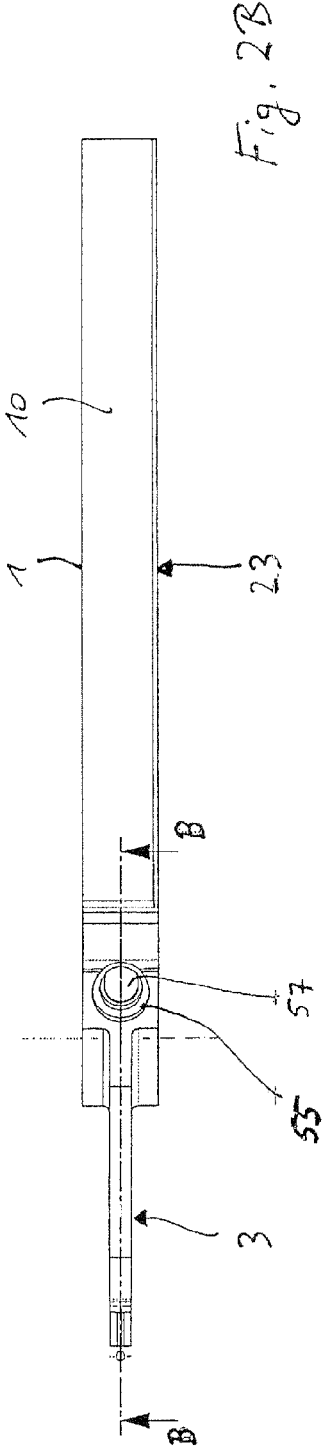
Fig. 2A
Fig. 2B

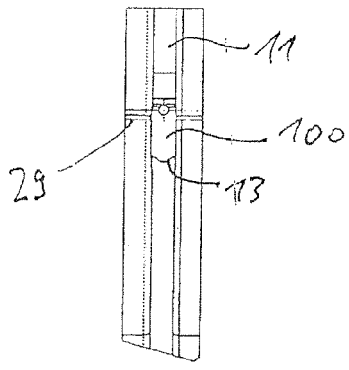
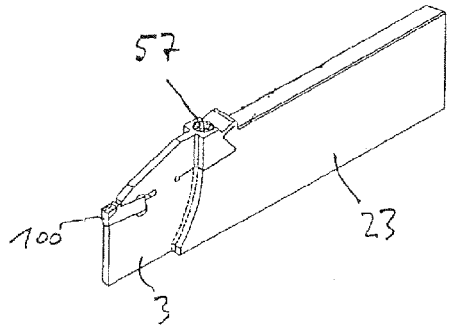
Fig. 2C    Fig. 2D
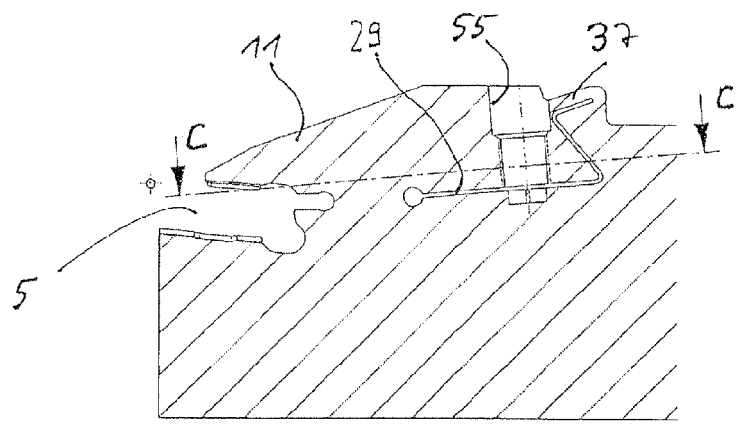
Fig. 2E
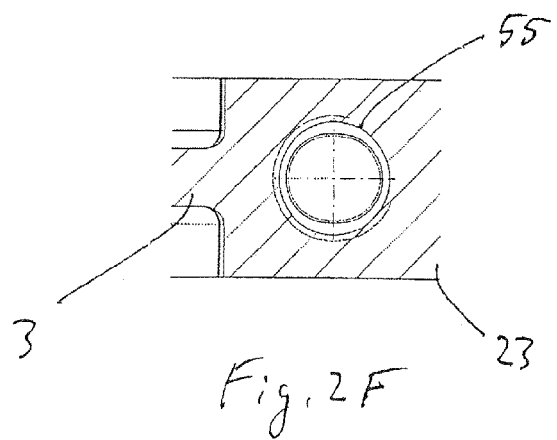
Fig. 2F

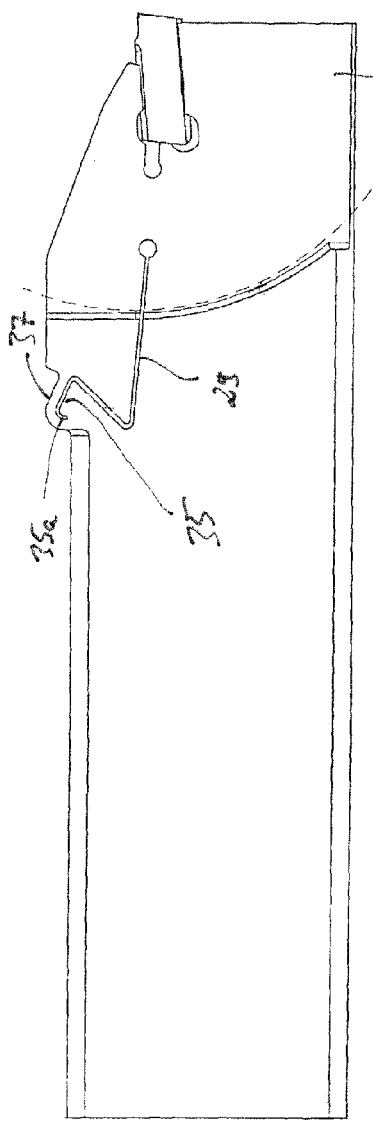
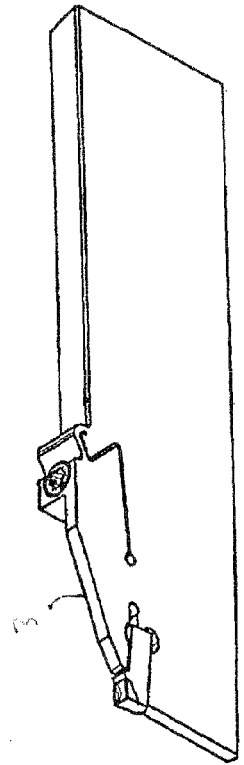

HOLDER FOR A CHIP-REMOVING TOOL INSERT

CROSS-REFERENCE TO RELATED APPLICATIONS

This is a continuation-in-part application of International patent application PCT/EP2009/002948, filed on 23 Apr. 2009, designating the United States and published as WO 2009/135592 A1, which claims priority to German application no. 10 2008 023 767.1, filed on 9 May 2008, which are hereby incorporated by reference herein in their entirety, including any figures, tables, or drawings.

BACKGROUND OF THE INVENTION

1. Field of the Invention

The present invention relates to a holder for a chip-removing tool insert, in particular a recessing or cutting insert, having an approximately bar-shaped cutter carrier, a cavity formed inside the end thereof, which serves as a receiving pocket for the tool insert and is delimited by clamping jaws that define the inside width of the receiving pocket, a slot extending with a first end to within the proximity of the inner limit of the receiving pocket so as to permit elastic pivotability of one of the clamping jaws, and having a clamping arrangement comprising an actuation member for producing a clamping force that acts within the region of the slot upon the pivotable clamping jaw. Further, the present invention relates to a corresponding tool having such a holder and a tool insert inserted in the cavity of the holder.

2. Related Prior Art

Such a holder for a chip-removing tool insert is described, for example, in EP 0 937 526 A1. In particular, in the case of the known holder, a bore that receives the actuation member is disposed at a distance from the slot, and a force transfer member, which transfers the clamping force from the actuation member onto the movable clamping jaw, is displaceably guided in the cutter carrier. Owing to this spatial separation of the actuation member from the slot, and owing to the fact that the clamping force is transferred to the clamping jaw via a structural element guided in the cutter carrier, the transfer of force is effected along a defined line of application, such that disturbing transverse forces are largely prevented. Consequently, it is in principle possible to work in a trouble-free and safe manner with relatively large clamping forces.

SUMMARY OF THE INVENTION

It is the object of the present invention to further improve a holder of the type mentioned at the outset, in particular in respect of the take-up of transverse force components that can be produced, for example, in the case of one-sided loading of the tool insert or in the case of a piece having broken off from the tool insert.

In an aspect of the present invention, a holder is presented having an approximately bar-shaped cutter carrier, a cavity formed inside the end thereof, which serves as a receiving pocket for the tool insert and is delimited by clamping jaws that define the inside width of the receiving pocket, a slot extending with a first end to within the proximity of the inner limit of the receiving pocket so as to permit elastic pivotability of one of the clamping jaws, and extending with as second end to within the proximity of the side edge of the cutter carrier, a clamping arrangement comprising an actuation member for producing a clamping force that acts within the region of the slot upon the pivotable clamping jaw, and an elastic connecting web that bridges the second end of the slot being disposed between the pivotable clamping jaw and the cutter carrier.

In another aspect of the present invention, a tool for chip-removing of a workpiece is presented having such a holder and a tool insert inserted in the cavity of the holder.

The invention is based on the idea that disturbing forces that, during use of the tool, act upon the tool insert and therefore also upon the pivotability of the clamping jaw, can be even better transferred from the tool insert to the holder, in particular to the cutter carrier, and therefore better taken up overall, if the pivotable clamping jaw is not only fixedly connected to the cutter carrier in one region (i.e. in the region between the inner limit of the receiving pocket and the first end of the slot), but if a connection is provided at a further location. An elastic connecting web in the end region of the second end of the slot has been found to be particularly advantageous in this respect, such that the second end of the slot thus no longer opens outwards entirely at the side edge, as in the case of the known holder, but is, as it were, bridged there by the elastic connecting web.

This connecting web, of course, must be designed with such elasticity that the pivotability of the clamping jaw relative to the cutter carrier is still assured, but that, on the other hand, there is still sufficient stiffness to transfer transverse forces from the clamping jaw to the cutter carrier. Because of the elasticity, the clamping web acts, as it were, like a spring, which can also be instrumental in the clamping jaw being guided back into its initial position upon the pivotable clamping jaw being relieved of the pressure applied by the actuation member. Depending on the actual design of the holder, in particular also of the actuation member, this can be the clamping position, in which the tool insert is clamped, or the removal position, in which the tool insert can be removed.

Preferably, it is provided that the connecting web is composed of the same material as the cutter carrier and/or the pivotable clamping jaw. In particular, the connecting web must be designed so as to be integral with the cutter carrier and the pivotable clamping jaw. This has advantages in respect of both the production engineering and the mechanical strength.

Preferably, the connecting web has a thickness of less than 3 mm, in particular in the range from 0.5 mm to 2 mm. A thickness in this range ensures a sufficient elasticity with, at the same time, sufficient mechanical solidity of the connecting web.

In further preferred designs, it is provided that the slot is offset angularly in the region of the second end, the angularly offset end region of the slot preferably running in an inclined manner from the side edge towards the receiving pocket. Preferably in this case, the angle of the inclination, relative to the longitudinal axis of the holder, lies in the range between 5° and 45°, in particular in the range between 10° and 40°. Such an angularly offset design, in particular with the described inclination of the end region of the slot, has the further advantage that, upon the tool insert being fixed onto the pivotable clamping jaw, an additional pressure acts in the direction of the receiving pocket, such that this ultimately results in a further increase in the clamping force acting upon the tool insert. Upon actuation of the actuation member, the rear part of the clamping jaw rotates, as it were, about a rotation point located in the connecting web, this causing a forward pressure upon the clamping jaw, because of the oblique position of the end region of the slot.

In further advantageous designs, it is provided that the outside of the connecting web runs parallel to the slot in the region of the second end, and/or that the outside of the connecting web has the same inclination as the angularly offset end region of the slot. As a result, the connecting web has a constant thickness, and the appropriate elasticity and stiffness of the connecting web can be set particularly satisfactorily.

Preferably, the slot has a Z-shaped course. Apart from the fact that this design necessitates only few changes in respect of the known structural form of the holder, in the case of this design the middle region of the slot (between the two sharp bend points) can be used as a rear stop for the pivotable clamping jaw.

In a development, it is provided that the connecting web runs in an angularly offset manner in the case of the second end of the slot. In particular, it is further provided that the outside of the connecting web runs in a stepped shape, in particular having one or two steps. As a result, a type of spring action is imparted to the connecting web (in the manner of a leaf spring). If necessary, it can be provided, as protection, that a protective bevel is in each case applied to the edges, on the outside.

In principle, in the case of the holder according to the invention, the slot is disposed entirely within the holder, and does not open outwards at the side edge, as in the case of the known holder. Thus, at the side edge, the connecting web bridges the second end of the slot. In a development, however, it is provided that the connecting web is disposed so as to lie further within the holder, and a further edge slot is disposed, on the side of the connecting web that faces away from the slot, as far as the side edge of the cutter carrier. The lateral slot thus extends from the connecting web to the outside, to the side edge, and can be disposed, for example, in such a way that it continues, as it were, the actual slot as far as the side edge, which slot terminates on the other side of the connecting web. In the case of this design, the upper edge surface of the holder (i.e. the upper clamping surface) can remain substantially unchanged relative to the known design.

Differing designs are conceivable for the disposition and design of the actuation member. A first design, which is also known from EP 0 937 526 A1, provides that the actuation member is rotatably mounted in a bore in the cutter carrier, that the bore is disposed at a distance from the slot, and that a force transfer member, which transfers the clamping force from the actuation member onto the movable clamping jaw, is displaceably guided in the cutter carrier. The transfer of force is thus effected along a defined line of application, such that disturbing transverse forces, which are produced, for example, in the case of excessive or improper actuation of the actuation member, and which act as a disturbing bending force on the movable clamping jaw, are prevented. This design additionally has the advantage that the actuation of the actuation member can be effected from the front (from the direction of the tool insert), this often being desirable in the case of restricted space when chucked in the machine tool, or even being the only possibility.

An alternative design provides that the actuation member is rotatably mounted in a bore in the movable clamping jaw or in the cutter carrier, and that the bore reaches as far as the slot, such that, through actuation of the actuation member, a variable pressure can be exerted upon the region of the cutter carrier, or of the movable clamping jaw, located at the end of the bore, for the purpose of altering the clamping force of the movable clamping jaw. In the case of this design, the force is thus transferred, not via an additional force transfer member, but directly from the actuation member through exertion of pressure. This design has the advantage that it is easier to produce and requires fewer components for the clamping arrangement.

The actuation member can be, for example, a setscrew, which—in the case of the first design—constitutes, at its end, a cone that acts upon the force transfer member, for example a ball or a pin. In respect of further details and designs of such an actuation member and force transfer member, reference is to be made to the said EP 0 937 526 A1. The designs described therein can, in principle, also be used in the case of the holder according to the invention.

BRIEF DESCRIPTION OF THE DRAWINGS

The invention is explained more fully in the following with reference to exemplary embodiments, which do not limit the invention and which are represented in the drawings, wherein:

FIG. 1 shows a first embodiment of a holder according to the invention, in various views, FIG. 2 shows a second embodiment of a holder according to the invention, in various views, FIG. 7 shows a seventh embodiment of a holder according to the invention and FIG. 8 shows an eighth embodiment of a holder according to the invention.

DESCRIPTION OF A PREFERRED EMBODIMENT

Figure 3:
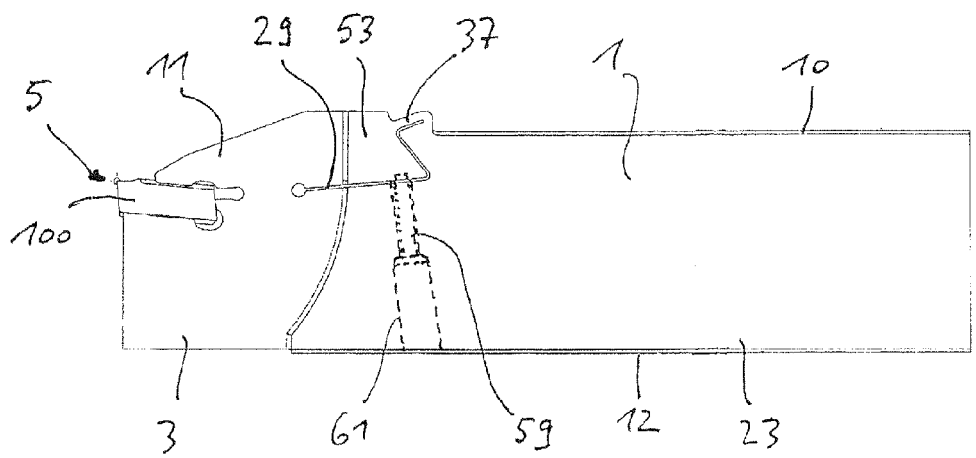
FIG. 3 shows a third embodiment of a holder according to the invention, in a side view.

FIG. 1 shows a first embodiment of a holder according to the invention, in differing views. Therein, FIG. 1A shows a side view, FIG. 1B shows a top view, FIG. 1C shows a section along the line A-A, FIG. 1D shows a front view, FIG. 1E shows a section along the line B-B, and FIG. 1F shows a perspective side view.

The holder has a cutter carrier 1, which, in its font end region 3, has a receiving pocket 5 in the form of an aperture that is open towards the outside face. A tool insert 100, which is exchangeable and is not a fixed constituent part of the holder, is inserted in this receiving pocket 5. The aperture that constitutes the receiving pocket 5 has an enlargement 7 at its inner end. In the forwardly running region adjoining the enlargement 7, the inside width of the receiving pocket 5 is delimited by two clamping jaws 9 and 11 that constitute clamping surfaces 13 and 15, which face towards one another and between which the tool insert 100 can be clamped. As can be seen to some extent from FIG. 1D, the clamping surfaces 13, 15 preferably each have a V-shaped longitudinal groove, a local recess preferably being sunk in the longitudinal groove of the clamping surface 13. This shaping of the clamping surfaces 13, 15 serves for precise positioning of the tool insert 100 provided with contouring that is complementary therewith.

To match the relatively small width of tool inserts 100, for example recessing inserts, to be received in the receiving pocket 5, the cutter carrier 1 has a lesser width in its front end region 3 than in its rear bar portion 23. The transition between the narrow end region 3 and the bar portion 23 is constituted by a slightly curved shoulder surface 25.

Starting from an opening 27 adjacent to the inner end of the enlargement 7 of the receiving pocket 5, a continuous slot 29 realized in the cutter carrier 1 extends rectilinearly beyond the curved shoulder surface 25, into the bar portion 23. This first rectilinear region of the slot 29 runs substantially parallel to the upper side edge 10 of the cutter carrier 1 or—as shown in the present exemplary embodiment—obliquely relative to this upper side edge 10 with a slight inclination downwards and forwards to the lower side edge 12 in the direction of the front end region 3. In the bar portion 23, the slot 29 has two sharp bend points 31 and 33, which give the slot 29 a Z-shaped course in the rear region. Between the sharp bend points 31, 33, the slot 29 in this case runs with an incline upwards and obliquely forwards towards the front end region 3. In the end region 35 after the sharp bend point 33, the slot 29 then again runs in a manner similar to the initial region of the slot 29, the end region 35 preferably having an even greater inclination than the initial region of the slot 29.

As can thus be seen from, in particular, FIGS. 1A and 1F, the slot 29, in particular its end region 35, does not open outwards at the upper side edge 10, but terminates at a distance from the upper side edge 10. The pivotable clamping jaw 11 is thus fixedly connected to the narrow end region 3 of the cutter carrier 1 not only, as in the case of the known design of the holder, in the region between the enlargement 7 of the receiving pocket 5 and the opening 27 at the start of the slot 29, but also via a connecting web 37 at the rear region of the pivotable clamping jaw 11, which bridges, as it were, the end region 35 of the slot 29 and connects the pivotable clamping jaw 11 to the bar portion 23.

The connecting web 37 is preferably (but not necessarily) composed of the same material as the rest of the holder 1 and integral with the latter. As can be seen, for example, in FIGS. 1A and 1F, the connecting web 37 runs parallel to the end region 35 of the slot 29, the outer contour of the connecting web 37 having the same inclination as the end region 35 of the slot 29, and therefore having a constant thickness. This thickness in this case is selected such that, on the one hand, the connecting web 37 has a sufficient stiffness to take up transverse forces that act upon the tool insert 100, and therefore on the pivotable clamping jaw 11, during use of the tool. On the other hand, the connecting web 37 must also be sufficiently elastic to ensure the pivotability of the clamping jaw 11, in order that the latter is sufficiently pivotable to clamp the tool insert 100 and to relieve the latter for an insert change. In order to fulfill both of these requirements, in a practical design the selected thickness of the connecting web 37 is less than 3 mm, preferably in the range between 0.5 and 2 mm.

The oblique disposition of the connecting web 37 and of the end region 35 of the slot 29 have the effect that, upon the clamping screw 39 being screwed in, a pressure component additionally acts forwardly (in the direction of the tool insert 100) and slightly downwardly upon the pivotable clamping jaw 11, which pressure component additionally applies a clamping force to the tool insert 100 and thereby effects even better clamping.

Overall, therefore, in the case of the holder shown, an elastic pivotability is obtained for the clamping jaw 11 because of the positional disposition of the slot 29, the center of rotation being located in the region between the opening 27 and the adjacent edge of the enlargement 7. Differing clamping means can be used in order to effect such a pivoting motion of the clamping jaw 11. A first design of such a clamping means, which is also used in the case of the holder known from EP 0 937 526 A1, is shown in FIG. 1.

In the case of this exemplary embodiment, a clamping screw 39, which sits in a bore 41 provided with an internal thread, is provided as an actuation member of the clamping means. The bore 41 extends at an angle relative to a second bore 45, which serves as a guide for a force transfer member 43, the bores 41 and 45 intersecting in the proximity of the slot 29. The outer mouth of the bore 41 is located on the shoulder surface 25, which constitutes the offset between the narrow, front end region 3 and the rear bar portion 22 of the cutter carrier 1. At this mouth opening, a Torx or internal hexagon 47, for example, of the clamping screw 39 can be accessed for rotary actuation of the latter.

At the other end, the clamping screw 39 has a cone 49, which projects into the second bore 45. A bolt 51 provided as a force transfer member bears, on the one hand, on the cone 49 and, on the other hand, on the underside of the rear portion 53 of the movable clamping jaw 11. In order to prevent the bolt 51 from falling out of the bore 45 when the clamping screw 39 has been screwed out, a retaining pin (not shown) can additionally be inserted in a retaining bore (not shown) that is tangent to the bore 45 and runs transversely beneath the bolt 51.

Screwing-in of the clamping screw 39 causes the circumferential surface of the end cone 49 to produce a clamping force in combined action with the bolt 51, which is guided in the bore 45. Consequently, only a force component having a line of application running along the axis of the bore 45, i.e., in principle, without any transverse force component, is applied to the portion 53 of the movable clamping jaw 11. As is clearly evident, the clamping means is self-retaining, i.e. the clamping force with which a respective tool insert 100 is clamped in the receiving pocket 5 can be nullified only by screwing out the clamping screw 39.

Figure 4:
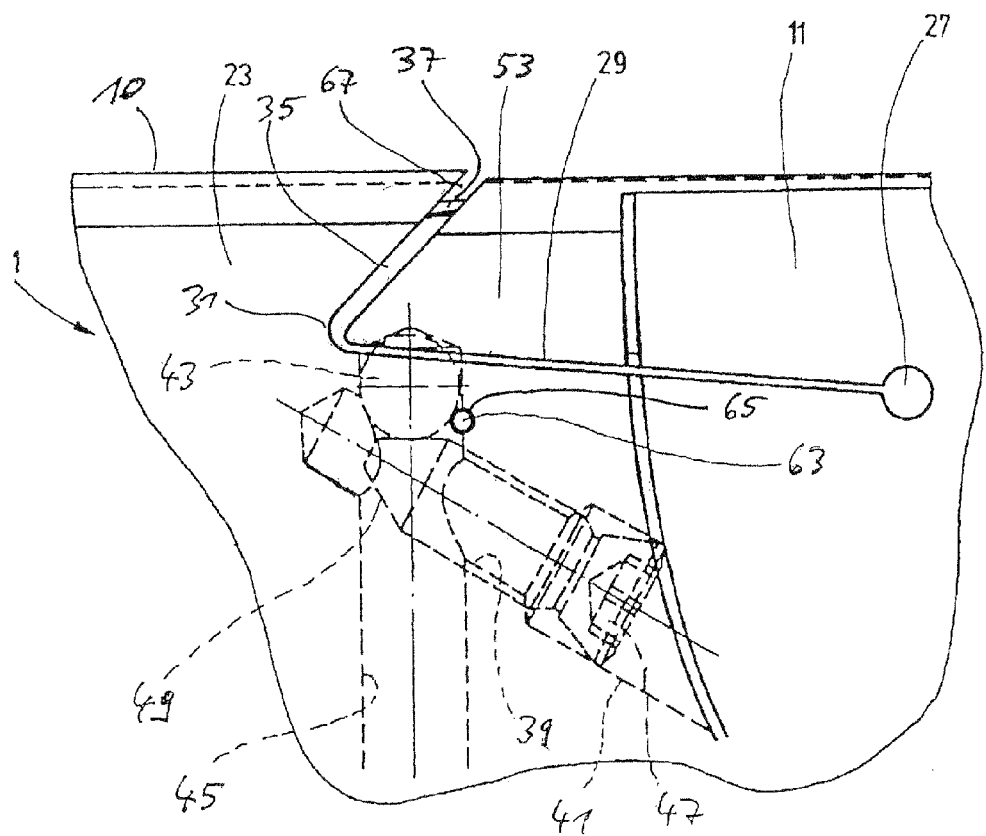
FIG. 4 shows a fourth embodiment of a holder according to the invention, in a side view.
Figure 5:
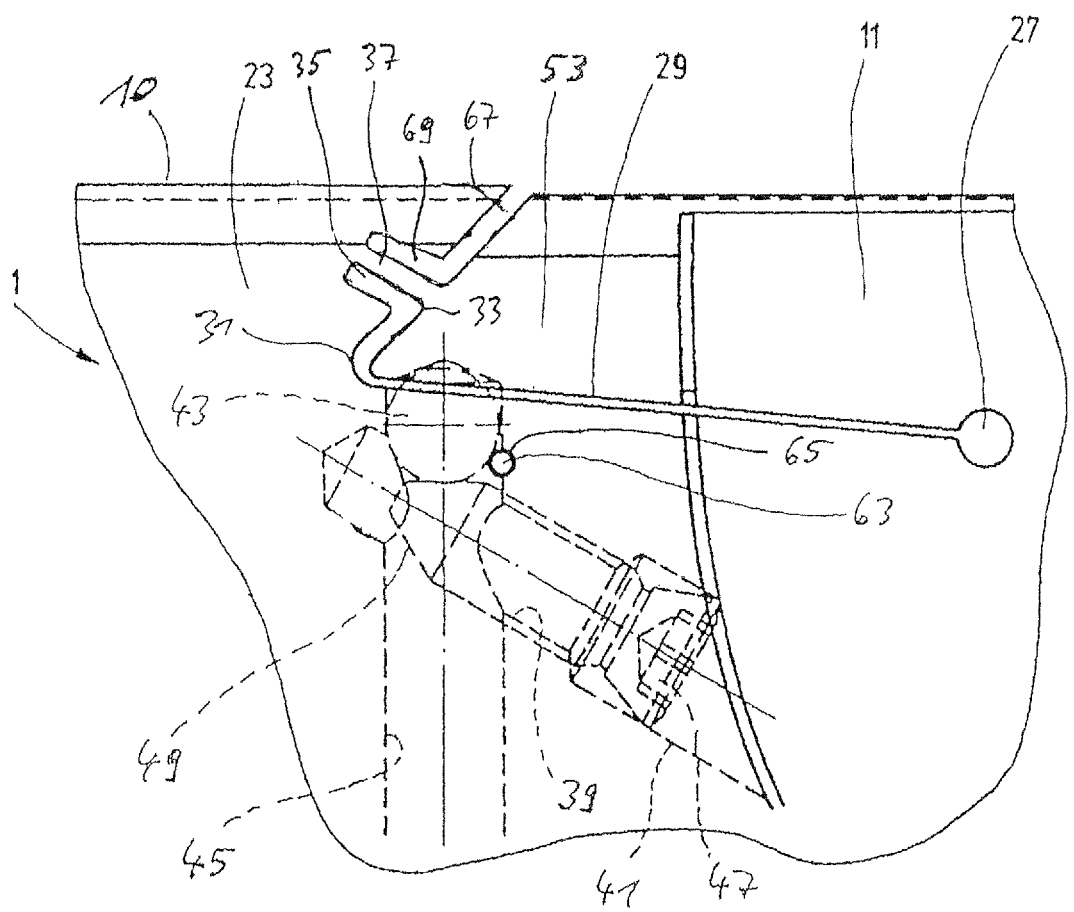
FIG. 5 shows a fifth embodiment of a holder according to the invention, in a side view.

Of course, the force transfer member 51 need not necessarily be a bolt, as shown in FIG. 1F, but can also be designed differently, for example as a ball, as shown in FIGS. 4 and 5 of the said EP 0 937 526 A1. Also conceivable are other designs that allow a transfer of the force from the actuation member 39, which, likewise, can be designed differently than shown in FIG. 1, of a force to the movable clamping jaw 11.

A second embodiment of a holder according to the invention is shown in FIG. 2. Therein, FIG. 2A shows a side view, FIG. 2B shows a top view, FIG. 2C shows a front view, FIG. 2D shows a perspective side view, FIG. 2E shows a section along the line B-B, and FIG. 2F shows a section along the line C-C. The fundamental design of the cutter carrier 1, in particular the design in the region of the cavity 5 for clamping the cutting insert 100 and the design of the slot 29, corresponds to the design of the cutter carrier 1 shown in FIG. 1. There are, however, the following differences.

The front end region 3 is not, as in the case of the cutter carrier 1 shown in FIG. 1, disposed laterally and eccentrically with respect to the longitudinal extent axis of the holder (as can be seen, in particular, in FIG. 1B), but runs centrally in relation to the longitudinal extent axis, through which the cutting plane B-B also runs (cf. FIG. 2B and FIG. 2F). The central design has the advantage that a better clamping of the tool insert can be effected, since pressure can be exerted centrally upon the pivotable clamping holder. The eccentric design has the advantage, by contrast, that a lateral side edge of the (entire) holder can be realized as a planar surface that can serve as a reference surface, this frequently being required for chucking the holder in the case of machine tools, and that permits collision-free working on this side (since there is no curved shoulder surface projecting on this planar side).

Further, the design of the clamping means differs from that in the case of the embodiment shown in FIG. 1. In the case of the embodiment shown in FIG. 2, a bore 55 is provided in the rear region 53 of the pivotable clamping jaw 11, which bore reaches from the side edge 10 at least as far as the slot 29, and if necessary slightly beyond the latter. The bore 55 in this case runs substantially perpendicular to the initial region of the slot 29. A clamping screw 57, which sits in the bore 55 provided with an internal thread, is again provided as a rotatable actuation member. Turning of the clamping screw 57 causes the latter to press from above against the lower inside of the slot 29, in order to clamp the pivotable clamping jaw 11. If, on the other hand, the clamping screw 57 is screwed out of the bore 55, the clamping jaw 11 is relieved again, such that the tool insert 100 can be removed. Overall, therefore, a structurally simple and cost-effective solution can be achieved.

FIG. 3 shows a further embodiment, which is very similar to the embodiment shown in FIG. 2. In the case of this embodiment, likewise, a relatively simple pressure screw, for example in the form of a setscrew, is used as an actuation member. In the case of this design, however, this pressure screw 59 does not sit in a bore routed through the rear portion of the pivotable clamping jaw 11, but in a bore 61 that runs slightly obliquely through the bar portion 23, beneath the slot 29, and perpendicularly relative to the initial region of the slot 29. The bore 61 thus runs from the lower side edge 12 of the bar portion 23 as far as the slot 29 and, if necessary, slightly beyond the latter, and again has an internal thread. Upon being screwed in, the clamping screw 59 presses, i.e. from below, against the rear portion 53 of the pivotable clamping jaw 11, in order to clamp the tool insert 100 in the receiving pocket 5. Otherwise, the functioning is in principle identical to the functioning of the embodiment shown in FIG. 2. Depending on the circumstances, in particular in the case of chucking of the holder in the machine tool, it can be appropriate to select this design instead of the design of the clamping means shown in FIG. 2.

FIG. 4 shows a further embodiment of a holder according to the invention, only the region of the slot 29 and of the clamping means being shown as an enlarged segment. The design of the clamping means in this case is similar to that of the clamping means shown in FIG. 1, a ball being used here instead of a force transfer member 43 in the form of a bolt (cf. FIG. 1F). Also shown here is the transversely extending retaining bore 65, in which a retaining pin 63 is inserted in order to prevent the ball 43 from falling out through the bore 45 when the clamping screw 39 has been screwed out.

Further, in the case of this embodiment, the end region of the slot 29 and the connecting web 37 are designed differently. In the case of this embodiment, the connecting web 37 no longer runs directly on the outer side edge 10 of the cutter carrier 1 (i.e. itself constitutes a part of the side edge 10), but runs further inwards and, as it were, divides the slot 29, in its end region, into two parts, or demarcates the actual slot 29 from a further edge slot 67, which, as it were, continues the end region 35 of the slot 29 beyond the connecting web 37 as far as the upper side edge 10. In principle, however, in the case of this embodiment, the function of the connecting web is the same as in the case of the other embodiments.

This embodiment has the advantage that the upper edge surface 10 is planar in form and has no steps or oblique surfaces, in particular because of the connecting web located on the outside in the case of the other embodiments.

In principle, the slot 29, as in the case of the embodiment shown in FIG. 4, can also have only a single sharp bend 31; there need not be two (or more) sharp bends, as shown in the case of the other embodiments. Further, the outer contour of the upper side face 10 can also be outwardly planar in the region of the connecting web 37, or of the mouth of the further slot 67 (as shown in FIG. 4), and need not necessarily be realized in a stepped form (as shown in FIGS. 1 to 3).

A further embodiment is shown in FIG. 5. This embodiment is very similar to the embodiment shown in FIG. 4. The slot 29, likewise, does not project as far as the side edge 10, but has two sharp bend points 31, 33 and an end region 35 extending obliquely forwards and downwards. The edge slot 67 is now designed in such a way that it opens outwardly but, in its inwardly located, angularly offset initial region 69, runs substantially parallel to the end region 35 of the slot 29, such that the connecting web 37 is constituted therebetween. In the case of this embodiment, also, the oblique course of the connecting web 37 causes the clamping jaw 11 to be tilted forwards and downwards when pressure is exerted upon the clamping jaw 11 by the clamping means, and a particularly good clamping of the tool insert to be achieved.

Figure 6:
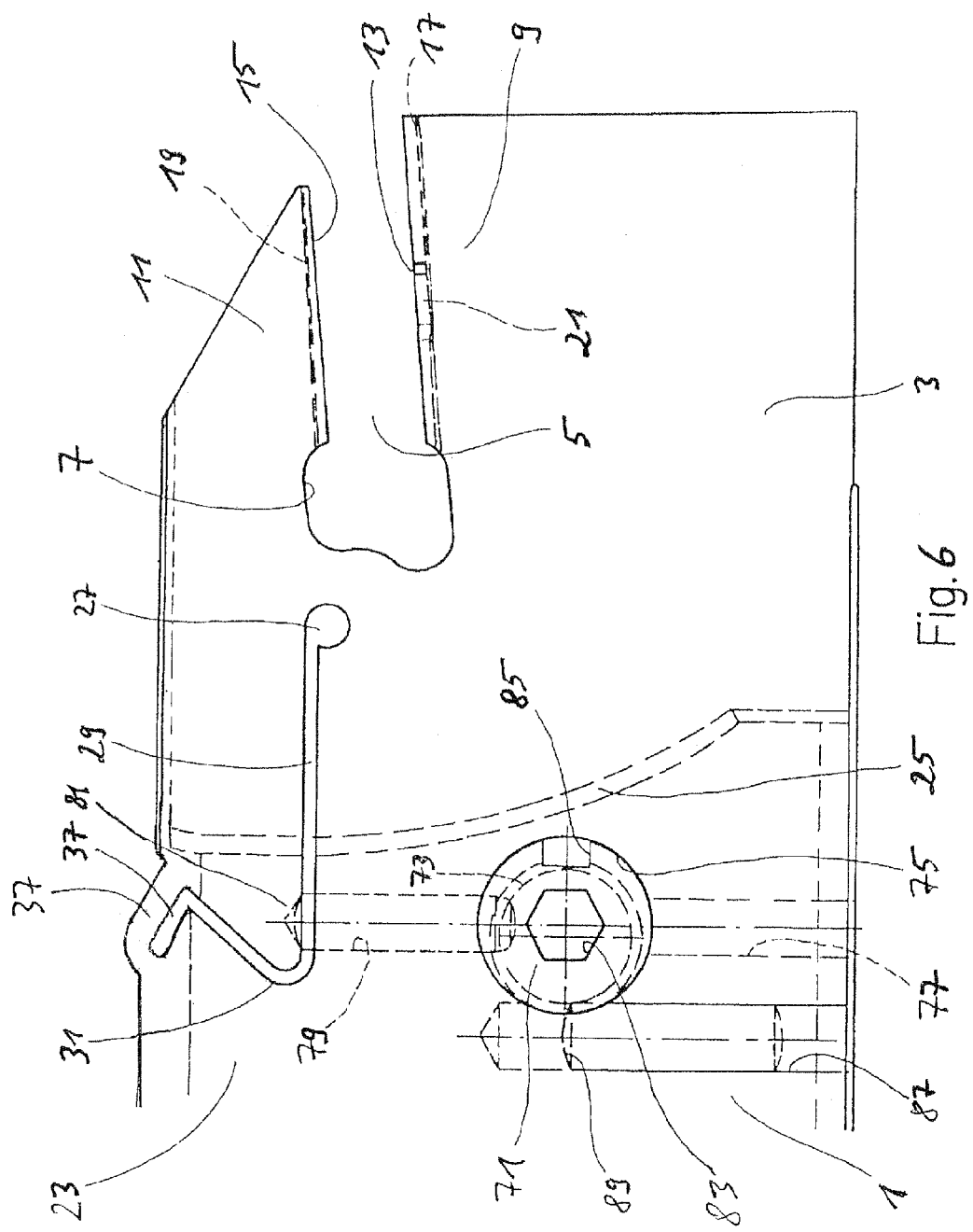
FIG. 6 shows a sixth embodiment of a holder according to the invention, in a side view.
Figure 8C:
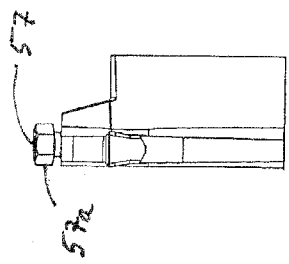
Figure 8A:
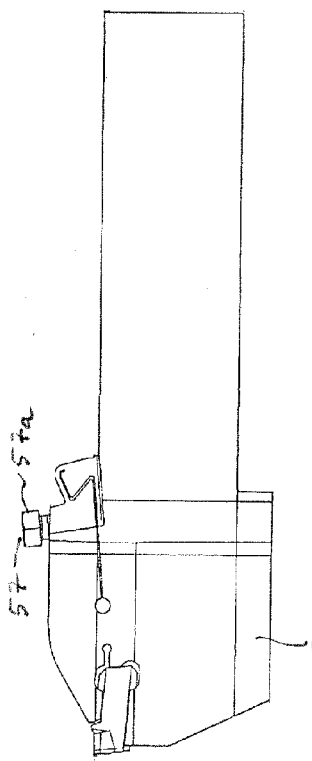
Figure 8B:
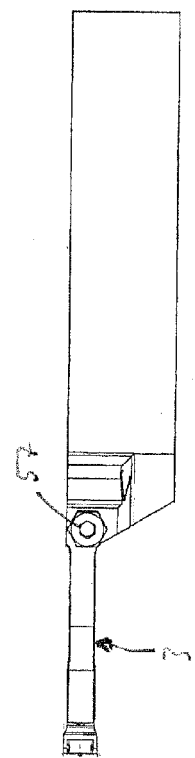
Figure 8D:
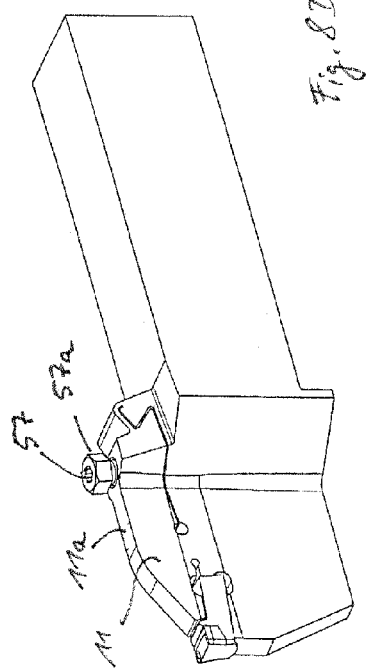

FIG. 6 shows a side view of a further embodiment of a holder according to the invention. In this figure, it can be seen, firstly, that the clamping surfaces 13, 15 each have a V-shaped longitudinal groove 17 and 19, respectively, a local recess 21 preferably being sunk in the groove 17. This shaping of the clamping surfaces 13, 15 serves for precise positioning of the tool insert provided with contouring that is complementary therewith. Such a design of the clamping surfaces can also be used in the case of other embodiments.

Further, in the case of this design, a connecting web 37 is provided, which is of a design similar to that of the embodiment shown in FIG. 1, and which runs parallel to the end region 35 of the slot 29. The statements made in respect of FIG. 1 apply equally to this connecting web, or the design of the holder in this region.

An eccentric 73, realized on a turning pin 71, is provided as an actuation member of the clamping means provided in the case of this embodiment. The turning pin 71 is rotatably mounted in a transverse bore 75 realized in the bar portion 23 of the cutter carrier 1. A second bore 77, which extends continuously from the lower edge of the bar portion 23 as far as the slot 29, where it opens adjacent to the location 31, intersects the transverse bore 75 in its central region. The portion of the bore 77 between the transverse bore 75 and the slot 29 constitutes a guide in which a force transfer pin 79 is received so as to be longitudinally displaceable. The pin 79 bears, on the one hand, on the radius of the eccentric 73 and, on the other hand, on the rear portion 81 of the movable clamping jaw 11 that is adjacent to the location 31 and that delimits the slot 29.

The eccentric 73 is constituted by an annular groove, which is sunk as a recess in the circumference of the circular cylindrical turning pin 71, offset relative to the rotational axis of the latter. For the rotary actuation of the turning pin 71 rotatably mounted in the transverse bore 75, the turning pin has a Torx or inner hexagon 83. Before the turning pin 71 is inserted in the transverse bore 75, the force transfer pin 79 can be introduced from the lower, open end of the bore 77. To enable the turning pin 71 then to be introduced into the transverse bore 75, the turning pin 71 has apertures 85 in the wall portions that laterally delimit the annular groove constituting the eccentric 73, which apertures, in the case of an appropriate rotary position of the turning pin 71, enable the latter to be introduced into the transverse bore 75 after the force transfer member 79 has been inserted.

A further bore 87 extending parallel to the bore 77 is tangent to the transverse bore 75 in the middle region, in which there is located the recessed annular groove that constitutes the eccentric 73 when the turning pin 71 has been inserted. Insertion of a retaining pin 89 in the bore 87 thus secures the turning pin 71 against axial displacement in the transverse bore 75, the retaining pin 89 engaging between the outer wall portions of the turning pin.

A clamping force that acts between the clamping surfaces 13, 15 can be produced by turning the turning pin 71 by means of a tool that acts in combination with the inner hexagon 83, via the force transfer pin 79, which bears, on the one hand, on the radius of the eccentric 73, and on the movable clamping jaw 11, at the rear end 81 of the latter. Since the force transfer pin 79 is guided in the bore 77, the transfer of the clamping force is effected without transverse force. The small cam lead of the eccentric 73 in combined action with the force transfer pin 79 ensures self-retention of the turning pin 71 rotatably mounted so as to fit in the transverse bore 75, such that the clamping of the tool insert secured in the clamping gap between the clamping jaws 9 and 11 can be nullified only through forced turning-back of the turning pin 71.

FIG. 7 shows a seventh embodiment of a holder according to the present invention in different views. FIG. 7A shows a side view, FIG. 7B shows a top view, FIG. 7C shows a front view, FIG. 7D shows a rear view, and FIG. 7E shows a perspective view. The embodiment is, to a large extent, identical to the embodiment of the holder shown in FIG. 2 so that most of the details are not explained again. However, in this seventh embodiment shown in FIG. 7, the front-end region 3 is disposed laterally and eccentrically with respect to the longitudinal extent axis of the holder. Further, the end region 35 of the slot 29 comprises an end portion 35*a* that is turned down in the direction of the central area of the holder. This contributes to a further increase in the stability of the connecting web 37, but still provides sufficient stability to enable the desired clamping function. Said clamping function is operated by use of the clamping screw 57 in the same manner as shown in the second embodiment depicted in FIG. 2.

An eight embodiment of the holder according to the present invention is shown in FIG. 8 in different views. FIG. 8A shows a side view, FIG. 8B shows a top view, FIG. 8C shows a front view, and FIG. 8D shows a perspective view. This embodiment of the holder is quite similar to the embodiment shown in FIG. 7. In particular, the front-end region 3 is also disposed laterally and eccentrically with respect to the longitudinal extent axis of the holder, and the end region 35 of the slot 29 also comprises a bent end section 35*a*. A clamping screw 58 in this embodiment also works according to the same principle, but in this embodiment the head 57*a* of the clamping screw extends beyond the upper surface 11*a* of the upper clamping jaw 11 so that by use of an appropriate tool, e.g. a jaw wrench, the clamping screw can be easily turned.

In principle, in the case of all embodiments, the connecting web need not necessarily extend over the entire width of the slot, but could also be provided only in regions (in one or more parts) along the width of the slot, provided that the required purpose of the connecting web continues to be fulfilled. Further, the position, course and dimensioning of the slot or slots and of the connecting web can also differ from those shown in the exemplary embodiments. These parameters depend also, in particular, on the actual design and functioning of the holder.

In principle, it is the case that the elasticity and stiffness, and therefore the capacity to take up transverse forces, can be set through the length, width, angle and course of the slot (in particular, of the end region of the slot) and of the connecting web. In particular, the lever action that is applied for the purpose of clamping the tool insert can be set through the length of the slot. Further, the differing designs of the connecting web and of the slot, and the differing designs of the clamping means of the embodiments shown above, can also be used in combinations with one another other than those shown.

Therefore, what is claimed, is:

1. A holder for a chip-removing tool insert, comprising:
an approximately bar-shaped cutter carrier,
a cavity formed inside an end thereof, which serves as a receiving pocket for a chip-removing tool insert and is delimited by clamping jaws that define an inside width of the receiving pocket,
a slot extending with a first end to within the proximity of an inner limit of the receiving pocket so as to permit elastic pivotability of one of the clamping jaws, and extending with a second end to within the proximity of a side edge of the cutter carrier, wherein the second end is closest portion of the slot to the side edge,
a clamping arrangement comprising an actuation member for producing a clamping force that acts upon the one of the clamping jaws, wherein the actuation member is arranged within the cutter carrier, and
an elastic connecting web that bridges the second end of the slot being disposed between the one of the clamping jaws and the cutter carrier.

2. The holder as claimed in claim 1, wherein the connecting web is composed of the same material as the cutter carrier and/or the pivotable clamping jaw.

3. The holder as claimed in claim 1, wherein the connecting web has a thickness of less than 3 mm.

4. The holder as claimed in claim 1, wherein the slot is offset angularly in the region of the second end.

5. The holder as claimed in claim 4, wherein the angularly offset end region of the slot runs in an inclined manner from the side edge towards the receiving pocket.

6. The holder as claimed in claim 5, wherein the angle of the inclination, relative to the longitudinal axis of the holder, lies in the range between 5° and 45°.

7. The holder as claimed in claim 1, wherein the outside of the connecting web runs parallel to the slot in the region of the second end.

8. The holder as claimed in claim 5, wherein the outside of the connecting web has the same inclination as the angularly offset end region of the slot.

9. The holder as claimed in claim 1, wherein the slot has a Z-shaped course.

10. The holder as claimed in claim 1, wherein the outside of the connecting web runs in a stepped shape.

11. The holder as claimed in claim 1, wherein the connecting web is disposed so as to lie within the holder, and an edge slot is disposed, on the side of the connecting web that faces away from the slot, as far as the side edge of the cutter carrier.

12. The holder as claimed claim 1, wherein the actuation member is rotatably mounted in a bore in the cutter carrier, wherein the bore is disposed at a distance from the slot, and wherein a force transfer member, which transfers the clamping force from the actuation member onto the one of the clamping jaws, is displaceably guided in the cutter carrier.

13. The holder as claimed in claim 1, wherein the actuation member is rotatably mounted in a bore in the one of the clamping jaws or in the cutter carrier, wherein the bore reaches as far as the slot, such that, through actuation of the actuation member, a variable pressure can be exerted upon the region of the cutter carrier, or of the one of the clamping jaws, located at the end of the bore, for the purpose of altering the clamping force of the one of the clamping jaws.

14. The holder as claimed in claim 1, wherein the holder is adapted for holding a recessing or cutting insert.

15. A tool for chip-removing machining of a workpiece, having a holder as claimed in claim 1 and a chip-removing tool insert inserted in the cavity of the holder.

16. The holder as claimed in claim 5, wherein the angle of the inclination, relative to the longitudinal axis of the holder, lies in the range between 10° and 40°.

17. The holder as claimed in claim 11, wherein the outside of the connecting web runs in a stepped shape having one or two steps.

18. The holder as claimed in claim 3, wherein the connecting web has a thickness in the range from 0.5 mm to 2 mm.

* * * * *